(12) United States Patent  
Rogelja

(10) Patent No.: US 9,599,144 B2  
(45) Date of Patent: Mar. 21, 2017

(54) LINKS SUCH AS KARABINERS

(71) Applicant: Andrew Rogelja, Coraki (AU)

(72) Inventor: Andrew Rogelja, Coraki (AU)

( * ) Notice: Subject to any disclaimer, the term of this patent is extended or adjusted under 35 U.S.C. 154(b) by 0 days.

(21) Appl. No.: 14/938,217

(22) Filed: Nov. 11, 2015

(65) Prior Publication Data

US 2016/0061251 A1    Mar. 3, 2016

Related U.S. Application Data

(63) Continuation-in-part of application No. PCT/AU2014/000517, filed on May 13, 2014.

(30) Foreign Application Priority Data

May 15, 2013  (AU) .................................. 2013901718

(51) Int. Cl.
| | |
|---|---|
| *F16B 45/02* | (2006.01) |
| *A63B 29/02* | (2006.01) |
| *F16B 45/04* | (2006.01) |

(52) U.S. Cl.
CPC .............. *F16B 45/02* (2013.01); *A63B 29/02* (2013.01); *F16B 45/04* (2013.01); *Y10T 24/45309* (2015.01); *Y10T 24/45361* (2015.01)

(58) Field of Classification Search
CPC .......... A63B 29/02; F16B 45/02; F16B 45/04; F16G 15/02; F16G 15/04  
See application file for complete search history.

(56) References Cited

U.S. PATENT DOCUMENTS 195,940 A * 10/1877 Martin .................... F16G 15/02  
24/598.2  
333,095 A * 12/1885 Munro .................... F16G 15/02  
59/85

(Continued)

OTHER PUBLICATIONS

International Search Report and Written Opinion mailed on Jun. 25, 2014 for International Application No. PCT/AU2014/000517.

*Primary Examiner* — Robert J Sandy  
*Assistant Examiner* — David Upchurch  
(74) *Attorney, Agent, or Firm* — Stinson Leonard Street LLP

(57) ABSTRACT

A link such as a karabiner has a body portion and a gate portion which is mounted to the body portion about a pivot. The gate defines a free end which is arranged to inter-engage with a nose of the body portion to define a closed ring for receiving a rope passing therethrough and including a first sleeve which, when the ring is closed, is moveable between a first position where the gate is free to rotate about the pivot in at least one direction, and a second position where the sleeve at least partly encloses the free end of the gate and the nose and substantially prevents rotation of the gate about the pivot. The link further includes a second sleeve which is internally threaded and which is mounted on an externally threaded portion of the gate for movement towards and away from the free end of the gate and which may be rotated towards the first sleeve when the first sleeve is in the second position, to prevent movement of the sleeve into first position in which the gate is free to rotate. A dual sleeve maillon, of similar design but omitting the pivoting gate having two sleeves is also described.

17 Claims, 5 Drawing Sheets

(56) References Cited

U.S. PATENT DOCUMENTS

| | | | | |
|---|---|---|---|---|
| 558,056 A * | 4/1896 | Fechner | F16B 45/02 | 24/599.5 |
| 691,433 A * | 1/1902 | Baker | F16G 15/02 | 24/598.3 |
| 1,373,235 A * | 3/1921 | Giberson | F16B 45/02 | 24/600.1 |
| 1,447,064 A * | 2/1923 | Cousins | B21L 15/00 | 59/35.1 |
| 1,454,335 A * | 5/1923 | Prendergast | F16G 15/02 | 362/457 |
| 2,524,935 A * | 10/1950 | Skold | B63B 21/20 | 59/85 |
| 3,330,106 A * | 7/1967 | Spilhaug | F16G 15/02 | 59/85 |
| 4,894,944 A * | 1/1990 | Jimenez | A01K 75/00 | 24/598.3 |
| 6,588,076 B1 * | 7/2003 | Choate | F16B 45/02 | 24/599.1 |
| 6,637,182 B1 * | 10/2003 | Chang | F16G 15/04 | 59/85 |
| 6,926,486 B1 * | 8/2005 | Kooser | B21D 51/32 | 413/1 |
| 7,228,601 B2 * | 6/2007 | Thompson | F16B 45/02 | 24/598.2 |
| 7,287,775 B2 * | 10/2007 | Walker | A63C 7/04 | 280/400 |
| 7,320,159 B2 * | 1/2008 | Petzl | F16B 45/02 | 24/599.5 |
| 7,823,395 B2 * | 11/2010 | Wiser | F16B 37/00 | 62/298 |
| 7,900,430 B1 * | 3/2011 | McCauley | F16G 15/04 | 59/85 |
| 8,060,994 B2 * | 11/2011 | Petzl | F16B 45/02 | 24/599.9 |
| 8,156,617 B2 * | 4/2012 | Schwappach | F16B 45/02 | 24/599.5 |
| 8,322,003 B2 * | 12/2012 | Petzl | F16B 45/04 | 24/598.2 |
| 2003/0209004 A1 * | 11/2003 | Chang | F16G 15/04 | 59/86 |
| 2006/0137151 A1 * | 6/2006 | Thompson | F16B 45/02 | 24/598.2 |
| 2009/0056088 A1 | 3/2009 | Petzl et al. | | |
| 2010/0269314 A1 * | 10/2010 | Petzl | F16B 45/04 | 24/591.1 |
| 2014/0179149 A1 * | 6/2014 | Starke | H01R 4/2433 | 439/359 |

* cited by examiner

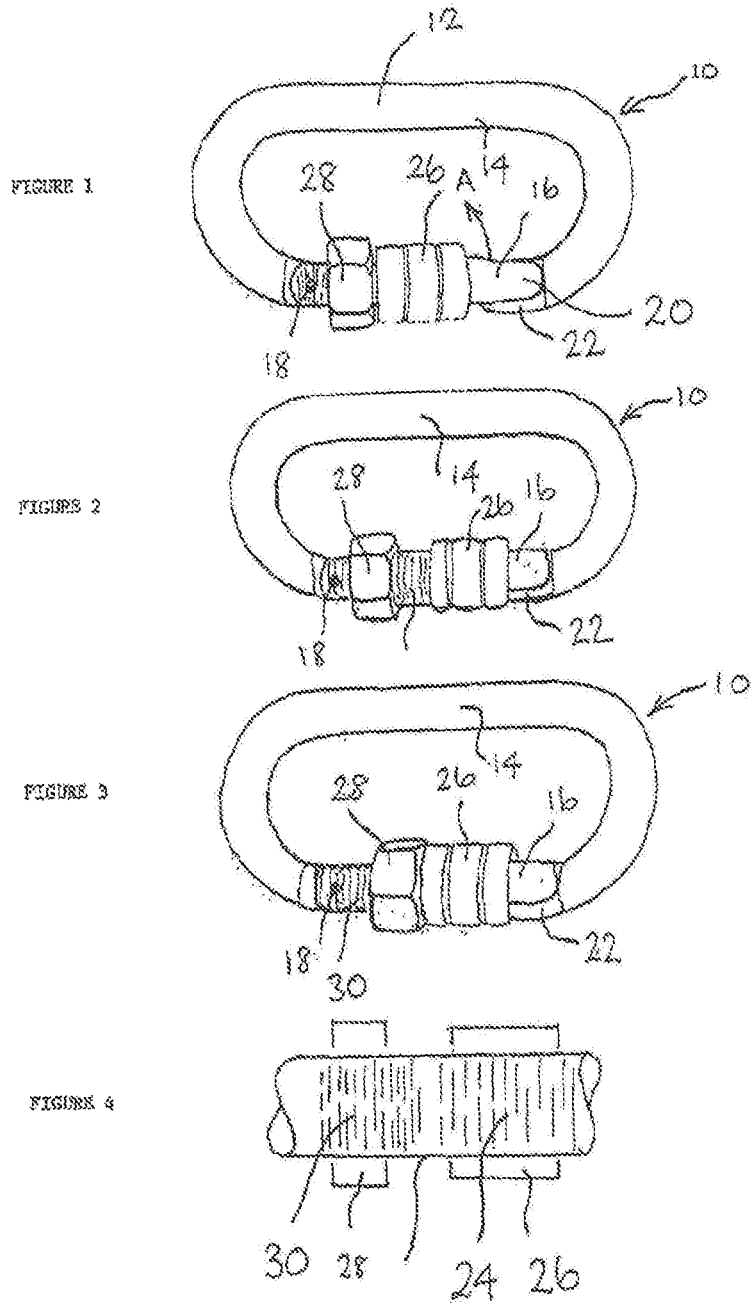

LINKS SUCH AS KARABINERS

CROSS-REFERENCE TO RELATED APPLICATIONS

The present application is a continuation-in-part of International Patent Application No PCT/AU2014/000517 (published as WO2014/183160) in the name of Andrew Rogelja entitled "Improvements in Karabiners", the content of which is incorporated herein by reference.

TECHNICAL FIELD

In one aspect, this invention relates to links which can be opened and closed and in particular to karabiners (carabiners) and in particular to a locking karabiner and also to a locking maillon.

BACKGROUND

Karabiners are safety devices which are used to connect components in safety critical systems, particularly, but not exclusively in mountaineering and abseiling and which are also used in military applications and in industrial rope access work on sites and in situations where safety is critical, such as working at heights.

While there are a number of different designs of karabiners, they generally comprise a metal ring which will typically be oval, D-shaped, or pear shaped, along one side of which there is a hinged gate portion, which is typically spring loaded, so that movement of the free end of the gate portion opens the ring to allow a rope, webbing or the like to be inserted inside the ring. While some karabiners are non-locking and simply provide a sprung gate, most karabiners, include some means of locking the gate in the closed position.

In one common locking karabiner design (referred to as a "screwgate") a threaded sleeve is provided for screwing over the free end of the gate portion to lock the gate closed.

The problem with the above design is that, in use, the threaded sleeve can move by frictional contact with other equipment, by vibration, or through inadequate tightening of the sleeve. Various changes have been proposed to the basic karabiner design to address the problem of the threaded sleeve coming undone.

"Twistlock" karabiners are one attempted solution to the problem. These karabiners include a sliding locking sleeve which is spring loaded and biased into the locking position, until the operator grasps and twists and pulls on the locking sleeve to disengage the free end of the gate. Twistlock karabiners are automatically locking and as soon as the operator releases the locking sleeve, it twists back into place to lock the gate. These are very difficult to use one handed and do not lock when exposed to grit which stops the spring from working When materials rub on the twistlock they can come undone very rapidly without warning.

"Ball-lock" karabiners are also known. In the case of these devices the operator must press a ball pin in order to turn the sleeve. While Twistlock and ball-lock karabiners can be more reliable than screwgate karabiners, the more complex design is less reliable particularly in adverse conditions (e.g. cold, snow ice etc . . . ), and more particularly cannot be operated using one hand, which is a major disadvantage in many applications where the operator may be hanging, and only have one free hand.

"Magnatron" karabiners are also known. These have two small levers with embedded magnets on either side of the locking gate which must be pushed or pinched simultaneously to disengage. Upon release, the levers pull shut and into the locked position against a small steel insert in the nose of the karabiner. With the gate open the magnets in the two levers repel each other so they do not lock or stick together, which might prevent the gate from closing properly. These type of karabiner have the advantages of one-handed operation, and re-engaging without additional user input. However they have mechanical parts that can fail however and are less reliable in adverse conditions.

The same problems which occur with screwgate karabiners also apply to maillons, which have a threaded sleeve which tightens over a thread, as opposed to the hinged gate of a karabiner. Maillons can be stronger than karabiners but are more difficult to use. They tend to be used for making more permanent connections.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

In a first broad aspect the invention provides a link which can be opened and closed, the link comprising a body portion and a first sleeve which is mounted on the body portion, and is movable from a first retracted position in which the link is open and a second position is which it is inter-engaged with the body portion to define a closed ring for receiving an object such as a rope, other link, or other object, passing therethrough, and further including a second sleeve which is internally threaded, and which is mounted on an externally threaded portion of the body portion for movement towards and away from the first sleeve and which may be rotated towards the first sleeve when the first sleeve is in the second position, and to prevent movement of the sleeve into the first position in which the link is open.

The link may be in the form of a maillon or a karabiner.

More particularly, according to the present invention there is provided a karabiner comprising a body portion and a gate portion which is mounted to the body portion about a pivot, the gate portion defining a free end which is capable of inter-engaging with a nose of the body portion to define a closed ring for receiving a rope webbing or the like, passing therethrough, and including a first sleeve which, when the ring is closed, is moveable between a first position where the gate portion is free to rotate about the pivot in at least one direction, and a second position where the sleeve at least partly encloses the free end of the gate portion and the nose and substantially prevents rotation of the gate portion about the pivot, and further including a second sleeve which is internally threaded, and which is mounted on an externally threaded portion of the gate portion for movement towards and away from the free end of the gate portion and which may be rotated towards the first sleeve when the first sleeve is in the second position, to prevent movement of the sleeve into the first position in which the gate portion is free to rotate.

As well as being used with rope and webbing, karabiners may also be used with/attached to harnesses, and other similar equipment.

Advantageously the karabiner is as easy to use as a standard "screwgate" karabiner, and can be operated with one hand, with the primary and secondary locking sleeves being moved by one hand, sequentially.

In one embodiment the first sleeve is internally threaded and rotatably mounted on a second correspondingly threaded portion of the body portion. The pitch of the second threaded portion may be greater than the pitch of the first threaded portion. Advantageously because the thread pitch of the second sleeve is finer than the thread pitch of the first sleeve the axial compression on the first sleeve is maximised for a given rotational torque and the locking effect of the second sleeve on the first sleeve is maximised In one embodiment the second sleeve is in the form of a nut.

Alternatively the second sleeve may have a generally cylindrical exterior which is contoured to provide grip.

The second sleeve may be used with "twistlock" and "ball-lock" karabiners in which case the first sleeve is a slidable sleeve.

As well as being used for climbing and working at heights the second sleeve may also be used for industrial & marine applications.

BRIEF DESCRIPTION OF DRAWINGS

Specific embodiments of the present invention will now be described, by way of example only, and with reference to the accompanying drawings in which:

FIG. 1 is a plan view of a first embodiment of a karabiner showing a sleeve and locking means in a disengaged position;

FIG. 2 is a plan view of the karabiner of FIG. 1 showing the sleeve in a locking position;

FIG. 3 is a plan view of the karabiner of FIG. 2 showing the sleeve in a locking position and a secondary locking means engaged against the sleeve;

FIG. 4 is a part-sectioned schematic view of a threaded portion of a gate of the karabiner of FIGS. 1 to 3;

DESCRIPTION OF PREFERRED EMBODIMENTS

Figure 5:
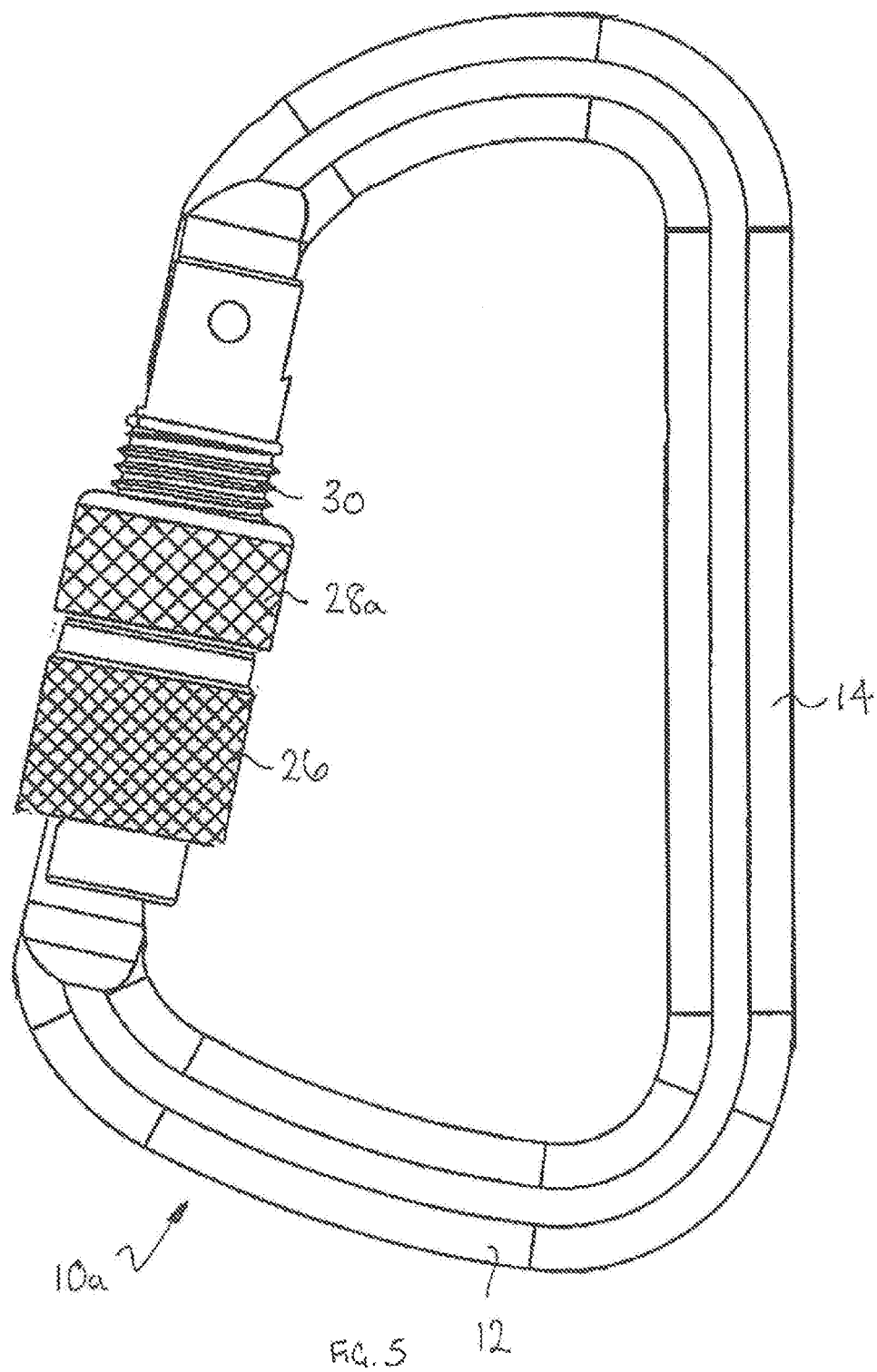
FIG. 5 is a plan view of a second embodiment of a karabiner in a locking position.

Referring to the drawings, FIGS. 1 to 4 show a first embodiment of a karabiner 10. The karabiner includes a body portion in the form of a generally D-shaped frame 12 made of a high strength material, typically a high strength metal such as steel or aluminium alloy. One side of the frame defines a solid spine 14 and the opposed side defines a gate 16 having a generally cylindrical exterior. The gate is pivoted to the frame by a pivot pin 18 and the free end of the gate 20 engages with a nose 22 of the frame. Typically the nose 22 will comprise a projection of reduced thickness/diameter compared to the thickness of the frame and the free end of the gate will define a slot, one side of which is closed, into which the projection fits when the gate is closed. The free end and the nose are configured with one side of the slot being closed such that the gate 16 may pivot inwardly only as shown by the arrow A. A spring biasing means is provided to bias the gate to the closed position shown in FIGS. 1 to 3.

The external surface of a portion of the gate is coarsely threaded at 24 (see FIG. 4) and a first or primary sleeve 26 having a substantially corresponding internal thread is mounted on the threaded portion 24 of the gate. As the sleeve is turned it moves along the thread 24 towards and/or away from the free end of the gate depending on the direction of rotation. Hence, with reference to FIGS. 1 and 2, rotation of the sleeve 26 causes the sleeve to move from the disengaged position shown in FIG. 1, in which the gate may open inwards, to the engaged position shown in FIG. 2 in which the gate is locked shut.

In FIGS. 1 to 3, a secondary locking sleeve in the form of a lock nut 28 can also be seen. With reference to FIG. 4 in particular, the nut 28 is internally threaded and rotates on a correspondingly threaded portion 30 of the gate. The threaded portion 30 is of a different thread to the thread 24 and is preferably more finely/narrowly threaded having a finer thread pitch than the pitch of the coarse thread 24.

As shown in FIG. 3, the nut 28 may be rotated on the threaded portion 30 of the gate until it abuts against the primary sleeve 26. This prevents the sleeve 26 from coming loose from its position securing the gate closed. Advantageously because the thread pitch of the nut 28 is finer than the thread pitch of the sleeve 26, the axial compression on the sleeve 26 is maximised for a given rotational torque and the locking effect of the nut on the sleeve is maximised.

Advantageously the karabiner is as easy to use as a standard "screwgate" karabiner and can be operated with one hand, with the primary and secondary locking sleeves being moved by one hand, sequentially.

Figure 6:
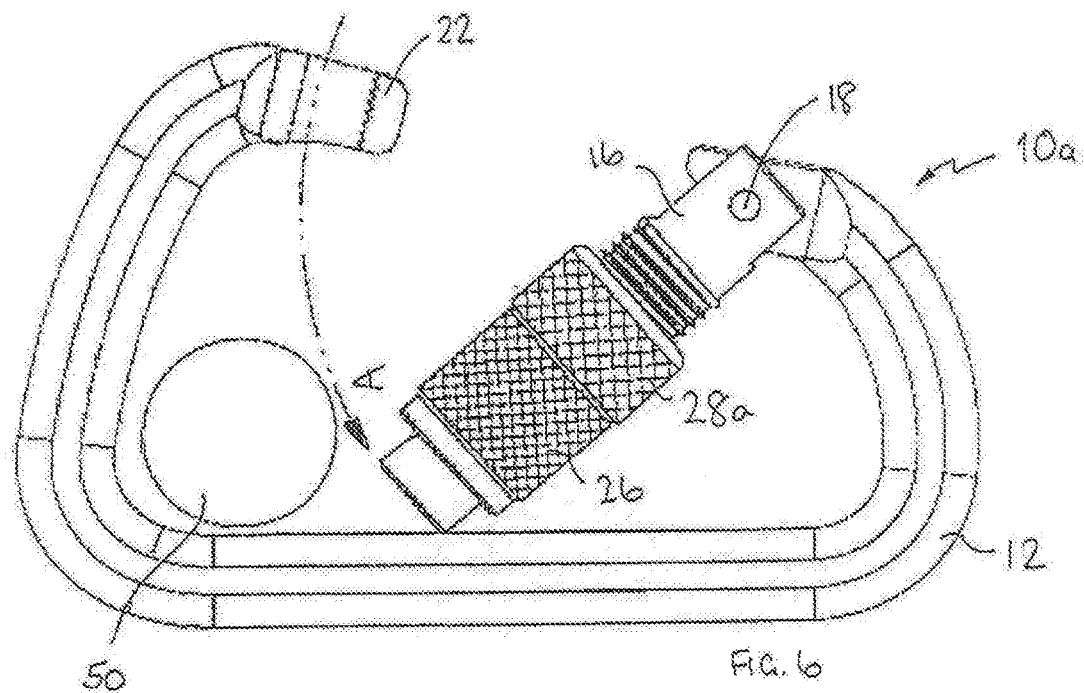
FIG. 6 is a plan view showing the karabiner of FIG. 5 with its gate open to receive a rope.
Figure 7:
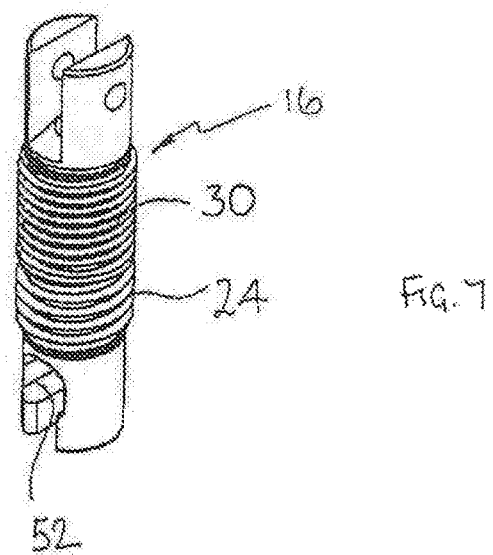
FIG. 7 is a perspective view of the gate of the karabiner of FIG. 6.

FIGS. 5 to 7 illustrate a second embodiment of karabiner 10a which functions in the same way as the first embodiment and the equivalent parts of the second karabiner 10a, carry the same reference numerals as are used in FIGS. 1 to 4. In the second embodiment in FIG. 6, the karabiner is shown in the open state and a rope 50 is shown inserted in the karabiner. As can also be seen the secondary sleeve 28a, is not a hexagonal nut but has a generally cylindrical exterior which is milled/contoured to create an external surface which can be gripped.

FIG. 7 in particular shows the gate 16 and the coarsely threaded portion 24 and the more finely threaded portion 30. FIG. 7 also shows the slot 52 in the gate into which the nose 22 of the frame locates when the gate is closed.

As well as being used for climbing and working at heights the second sleeve may also be used in industrial & marine applications.

Although the above embodiments show a ("screwgate") karabiner in which the sleeve is threaded to the frame of the karabiner to engage over the nose and free end of the gate thereby locking the ring closed, it will be appreciated that the threaded locking means embodying the present invention may be used with other types of karabiner, in particular the "Twistlock" and "Ball-lock" type karabiners and similar devices. In this case there need to be an extra threaded portion on the gate to receive the secondary sleeve.

Figure 8:
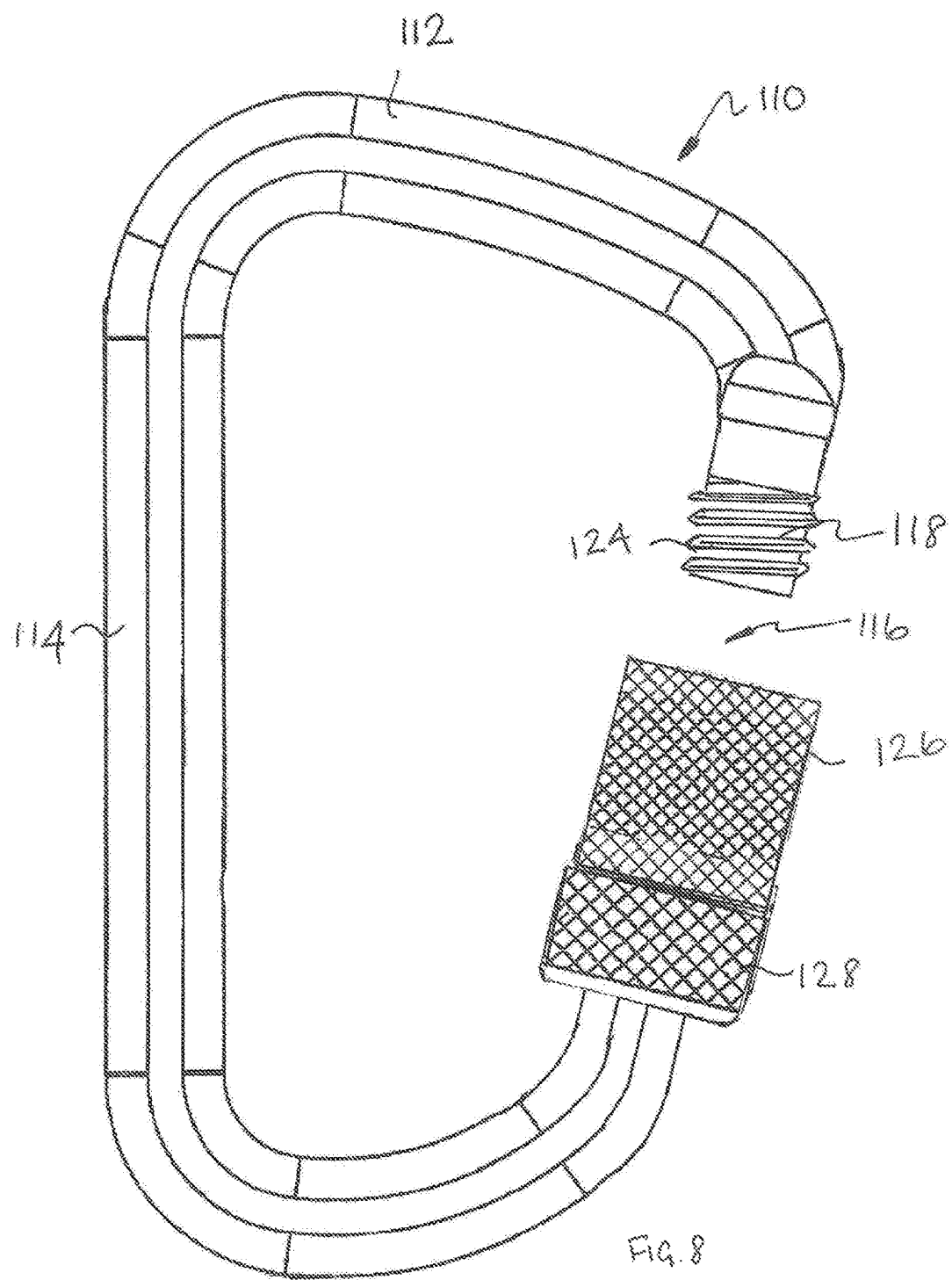
FIG. 8 a plan view of an embodiment of a maillon in an open position.
Figure 9:
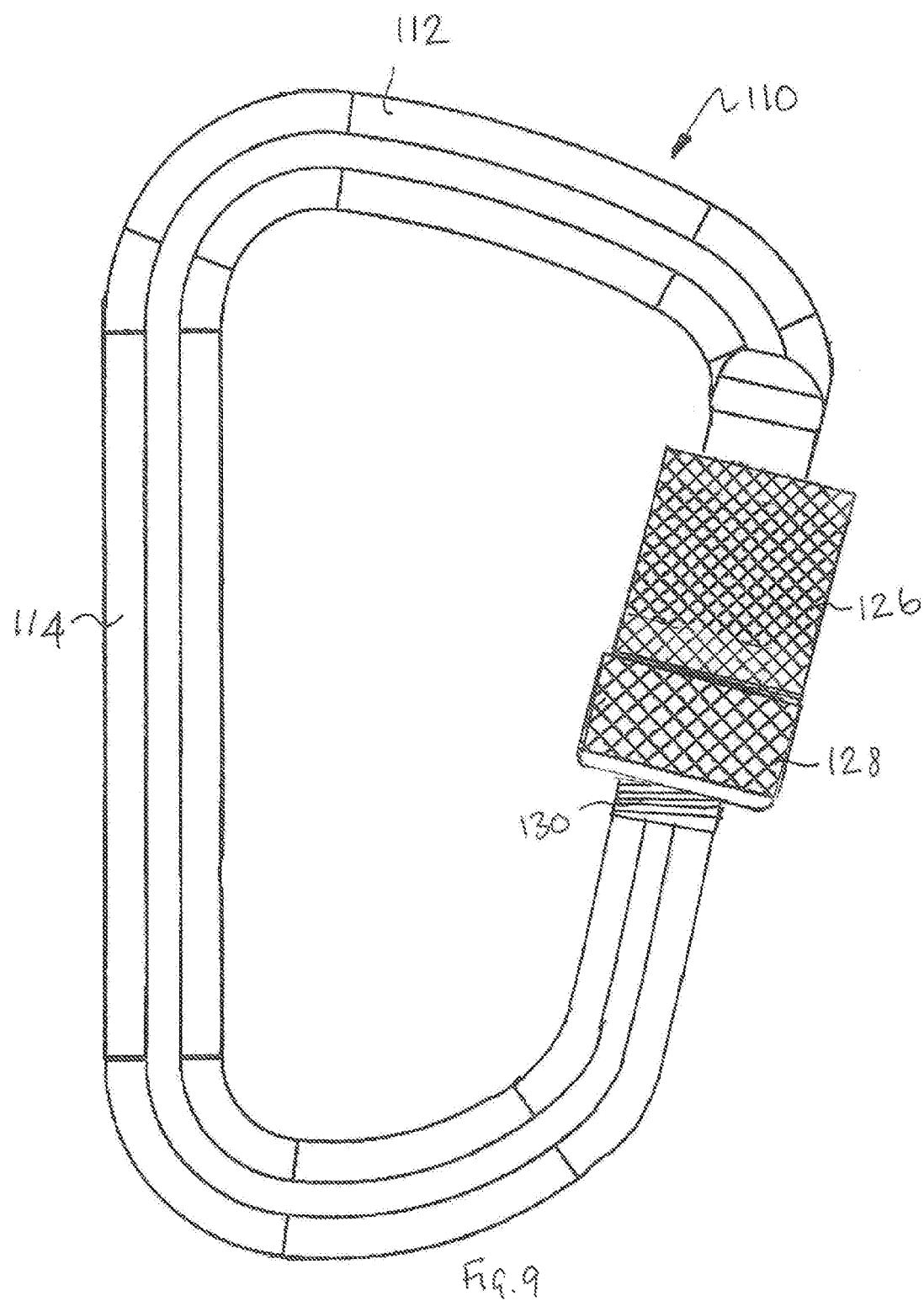
FIG. 9 a plan view of an embodiment of a maillon in a closed position

In particular FIGS. 8 and 9 show a Maillon 110 which includes a body portion in the form of a generally D-shaped frame 112 made of a high strength material, typically a high strength metal such as steel or aluminium alloy. One side of the frame defines a solid spine 114 and the opposed side defines a gap or opening 116. The head or part 118 of the maillon facing the opening is cylindrical and externally threaded with a coarse thread shown at 124

A first or primary sleeve 126 having a substantially corresponding internal thread is mounted on the opposed side of the gap on a first correspondingly threaded portion. As the sleeve is turned it moves along the thread towards and/or away from the free end of the gate depending on the direction of rotation. Hence, with reference to FIGS. 8 and 9, rotation of the sleeve 126 causes the sleeve to move from the open position shown in FIG. 8, to the closed position shown in FIG. 9 where the sleeve engages the thread 124 of the head in which position the maillon is closed and forms a continuous link.

In FIGS. 8 and 9, a secondary locking sleeve 128 can also be seen. The nut 128 is internally threaded and may rotates on a correspondingly second threaded portion 130 of the maillon on the opposed side of the gap to the head 118, adjacent the first threaded portion. The second threaded portion 130 is of a different thread to the thread 24 and is preferably more finely/narrowly threaded having a finer thread pitch than the pitch of the coarse thread 24. In the closed position shown in FIG. 9, the second sleeve abuts the first sleeve 126 and prevents it coming open.

It will be appreciated by persons skilled in the art that numerous variations and/or modifications may be made to the above-described embodiments, without departing from the broad general scope of the present disclosure. For example, the shape and configuration of the loop or nuts may be changed, as may the materials from which the karabiner is made. The present embodiments are, therefore, to be considered in all respects as illustrative and not restrictive.

The invention claimed is:

1. A link which can be opened and closed, the link comprising a body portion and a first sleeve which is mounted on the body portion, and is movable from a first retracted position in which the link is open and a second position in which the first sleeve is inter-engaged with the body portion to define a closed ring for receiving an object, and further comprising a second sleeve which is internally threaded, and which is mounted on an externally threaded portion of the body portion for movement towards and away from the first sleeve and which may be rotated towards the first sleeve when the first sleeve is in the second position, and to prevent movement of the first sleeve into the first position in which the link is open, wherein the first sleeve is internally threaded and rotatably mounted on a further correspondingly externally threaded portion of the body portion, and wherein the pitch of the threaded portion on which the second sleeve rotates is different to the pitch of the further threaded portion on which the first sleeve rotates.

2. A link as claimed in claim 1 wherein the pitch of the threaded portion on which the second sleeve rotates is less than the pitch of the further threaded portion on which the first sleeve rotates.

3. A link as claimed in claim 1 wherein the link comprises a maillon.

4. A link as claimed in claim 1 wherein the link comprises a karabiner.

5. A karabiner comprising a body portion and a gate portion which is mounted to the body portion about a pivot, the gate portion defining a free end which is capable of inter-engaging with a nose of the body portion to define a closed ring for receiving an object, and comprising a first sleeve which, when the ring is closed, is moveable between a first position where the gate portion is free to rotate about the pivot in at least one direction, and a second position where the first sleeve at least partly encloses the free end of the gate portion and the nose and substantially prevents rotation of the gate portion about the pivot, and further including a second sleeve which is internally threaded, and which is mounted on an externally threaded portion of the gate portion for movement towards and away from the free end of the gate portion and which may be rotated towards the first sleeve when the first sleeve is in the second position, to prevent movement of the first sleeve into the first position in which the gate portion is free to rotate, wherein the first sleeve is internally threaded and rotatably mounted on a further correspondingly externally threaded portion of the body portion, and wherein the pitch of the threaded portion on which the second sleeve rotates is different to the pitch of the further threaded portion on which the first sleeve rotates.

6. A karabiner as claimed in claim 5 wherein the pitch of the threaded portion on which the second sleeve rotates is less than the pitch of the further threaded portion on which the first sleeve rotates.

7. A karabiner as claimed in claim 5 wherein the second sleeve is in the form of a nut.

8. A karabiner as claimed in claim 5 wherein the second sleeve has a generally cylindrical exterior which is contoured to provide grip.

9. A link comprising:
   a body portion comprising a first threaded portion with a first thread pitch and a second threaded portion with a second thread pitch that is different than the first thread pitch;
   a first sleeve comprising threads that engage the first threaded portion, wherein the first sleeve is movable between a first retracted position and a second position, in which the first sleeve is inter-engaged with the body portion to define a closed ring; and
   a second sleeve comprising threads that engage the second threaded portion, wherein the second sleeve is operable to abut the first sleeve when the first sleeve is in the second position to prevent movement of the first sleeve to the first retracted position.

10. The link of claim 9, wherein the second thread pitch is less than the first thread pitch.

11. The link of claim 9, wherein the link comprises a karabiner.

12. The link of claim 11, wherein the body portion comprises a frame comprising one side defining a spine and an opposing side defining a gate, wherein the gate comprises the first threaded portion and the second threaded portion.

13. The link of claim 12, wherein the gate is pivoted to a portion of the frame, and the gate comprises a free end that is operable to engage a nose of the frame.

14. The link of claim 13, wherein the gate is biased to a closed position.

15. The link of claim 13, wherein the first threaded portion is positioned between the free end of the gate and the second threaded portion.

16. The link of claim 9, wherein the link comprises a maillon.

17. The link of claim 16, wherein the body portion comprises a frame comprising a side defining a spine and an opposed side defining an opening.

\* \* \* \* \*